United States Patent [19]

Levien

[11] Patent Number: 5,442,461
[45] Date of Patent: Aug. 15, 1995

[54] SCREEN GENERATION FOR HALFTONE SCREENING OF IMAGES WITH REDUCTION OF IRRATIONAL CORRECTION ARTIFACTS

[76] Inventor: Raphael L. Levien, P.O. Box 31, McDowell, Va. 24458

[21] Appl. No.: 912,913

[22] Filed: Jul. 13, 1992

Related U.S. Application Data

[63] Continuation-in-part of Ser. No. 814,880, Dec. 24, 1991, Pat. No. 5,276,535, and a continuation-in-part of Ser. No. 768,135, Sep. 27, 1991, Pat. No. 5,307,181, which is a continuation-in-part of Ser. No. 753,893, Sep. 3, 1991, Pat. No. 5,291,310.

[51] Int. Cl.$^6$ .................................................. H04N 1/40
[52] U.S. Cl. ..................................... 358/456; 358/465; 358/466; 358/458
[58] Field of Search .................... 358/456, 75, 78, 298, 358/256, 283, 280, 463, 465, 282, 455, 443, 459, 429, 536, 448, 534, 457, 458; 364/518, 519

[56] References Cited

U.S. PATENT DOCUMENTS

| | | | |
|---|---|---|---|
| 3,657,472 | 4/1972 | Taudt et al. | |
| 4,149,194 | 4/1979 | Holladay | |
| 4,185,304 | 1/1980 | Holladay | |
| 4,413,286 | 11/1983 | Boston | |
| 4,456,924 | 6/1984 | Rosenfeld | 358/75 |
| 4,499,489 | 2/1985 | Gall et al. | 358/75 |
| 4,920,501 | 4/1990 | Sullivan et al. | 364/518 |
| 5,051,844 | 9/1991 | Sullivan | 358/456 |
| 5,070,413 | 12/1991 | Sullivan et al. | 358/456 |
| 5,214,517 | 5/1993 | Sullivan et al. | 358/456 |
| 5,235,435 | 8/1993 | Schiller | 358/456 |
| 5,287,200 | 2/1994 | Sullivan et al. | 358/433 |
| 5,315,406 | 5/1994 | Levien | 358/456 |

FOREIGN PATENT DOCUMENTS

| | | |
|---|---|---|
| 0303190 | 2/1989 | European Pat. Off. |
| 0427380 | 11/1989 | European Pat. Off. |
| 0493935 | 7/1992 | European Pat. Off. |

*Primary Examiner*—Paul Ip
*Attorney, Agent, or Firm*—Allan Jacobson

[57] ABSTRACT

A halftone screen, at a desired screen angle and ruling, is generated by concatenating strips of an ideal angled screen pattern. Artifacts are reduced by aligning the vertical boundaries between adjacent strips. In one embodiment, a screen pattern is generated by storing a plurality of double width strips from an ideal angled screen pattern, and concatenating a sequence comprising a portion of each double width strip in a selected order. Regardless of the choice of starting point in the strip for each successive scan line, a sufficient portion of the double width strip is clocked out until the edge of the strip aligns with the strip above it. In a second embodiment, strips of a rational angled screen are concatenated to approximate an irrational angled screen. Errors which accumulate with each successive pixel are corrected by occasionally jumping to a new point in the strip. The vertical boundaries of successive horizontal strips aligned by placing the occasional jumps at the same point for each successive scan line. In a third embodiment, a screen pattern is generated by assembling fixed width strip portions, selected from a stored oversized strip of the ideal angled screen pattern. Since the width of all the strips in the screen is fixed, the vertical boundaries between adjacent strips are aligned.

26 Claims, 8 Drawing Sheets

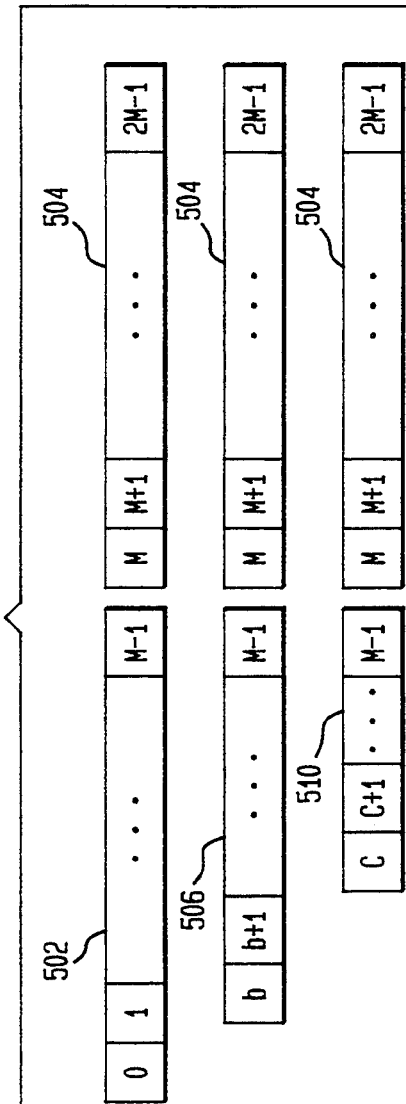

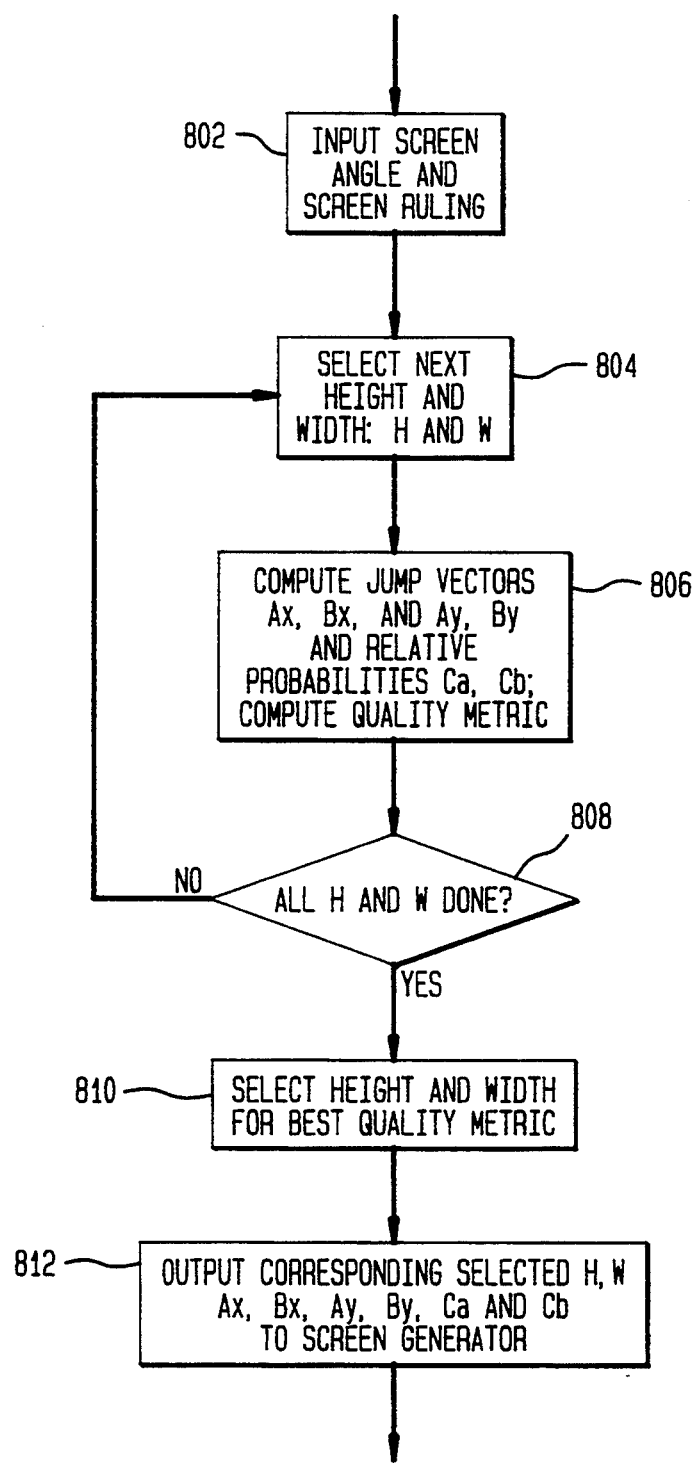

5,442,461

SCREEN GENERATION FOR HALFTONE SCREENING OF IMAGES WITH REDUCTION OF IRRATIONAL CORRECTION ARTIFACTS

This is a continuation in part application of U.S. patent application entitled, "METHOD AND APPARATUS FOR HALFTONING OF IMAGES USING GRAYSCALE ERROR DIFFUSION" Ser. No. 814,880, filed Dec. 24, 1991, now U.S. Pat. No. 5,276,535, and U.S. patent application entitled, "SCREEN GENERATION FOR HALFTONE SCREENING OF IMAGES USING SCAN LINE SEGMENTS OF OVERSIZED SCREEN SCAN LINES" Ser. No. 768,135 filed Sep. 27, 1991, now U.S. Pat. No. 5,307,181, which is a continuation in part of U.S. patent application entitled, "SCREEN GENERATION FOR HALFTONE SCREENING OF IMAGES" Ser. No. 753,893, filed Sep. 3, 1991, now U.S. Pat. No. 5,241,310.

FIELD OF THE INVENTION

This invention relates to the halftoning of photographic images using screen patterns, and more specifically to an improvement in the generation of screen patterns with precisely controlled angles and rulings.

BACKGROUND OF THE INVENTION

In the above cited copending patent application, "SCREEN GENERATION FOR HALFTONE SCREENING OF IMAGES" by the present inventor, a method and apparatus for halftone screening of images is described, using strips of an ideal angled screen pattern to form the horizontal scan lines of a desired screen. Successive strips of an ideal angled screen are selected and assembled into a desired screen on the basis of the calculated error between the ideal screen point at the end of one strip, and the actual screen point at the beginning of the next strip. The selection of successive horizontal strips based on the calculated error in UV (rotated) space, between the actual screen angle and the ideal screen angle, performs a screen angle correction function.

However, the difference or change in screen angle error between strips, particularly in the vertical direction, introduces what could be termed screen angle correction artifacts. The present application relates to a general improvement in the method and apparatus for halftone screening of images for reducing screen angle correction artifacts in generated halftone screens. A background description of halftone image screening is set forth below.

Images are typically stored in a memory representing tone values for each pixel of the original image. For a black and white image, the stored pixels represent the gray scale value corresponding to each pixel. For a color image, each color plane is stored as an array of pixels each representing the tone value for each pixel of the image in each respective color plane. For example, if each of the pixels of a black and white image is represented by a 8 bit digital word, then the tone value for a given image pixel may be one of 256 values between the black level and the white level.

Continuous tone images do not print well on most printing devices where typically the absence or presence of the ink on the paper is used to represent the printed image. In order to represent halftones (shades between the presence or absence of the printed ink), the original image is screened to produce a pattern, such as variable size dots which appear to the human eye as a halftone image.

In order to prepare a photograph for printing, it is first necessary to perform the step of halftone screening, which converts the continuous gray shades of the original into dots of varying size and shape. Typically, these dots are arranged on a regular grid of approximately 100 dots per inch. This spatial frequency is known as the screen ruling. Thus, one square inch of the final printed photograph will be composed of approximately 10,000 dots.

Screening to produce halftone images is well known. The screen consists of an array of dots, or halftone cells, each of which represents one section of continuous tone in the original image as a single dot of variable size and shape. A halftone cell, in turn, consists of an array of smaller screen pixels, or samples, each having individual values against which the input pixels derived from the original image will be compared. The individual values of the smaller screen pixels, or samples, of the repeating halftone cell which form the variable dots is referred to herein as a spot function.

The halftone screening step consists of a screen pattern generating step, and a comparison step between the input image and the screen pattern. The screen is usually stored as a fairly small pattern that repeats itself or is repeatedly generated by programming. At any point where the original image is greater than the screen pattern, the output is marked. At any point where the image is not greater than the screen pattern, the output is not marked. In other words, if the value of the image pixel is greater than corresponding value of the screen cell, a mark is generated by the marking engine, whereas if the value of the image pixel is less or equal to the screen cell value, then no mark is generated by the marking engine, or vice versa. In this way, the final screened image, composed of dots, is produced.

In color printing, there are four separate steps of halftone screening, one each for the cyan, magenta, yellow, and black inks. It is advantageous, in order to minimize objectionable moire patterns, to angle the halftone grid differently for each of the four planes. For example, the most common practice is to angle the cyan dots by 15 degrees, magenta by 75 degrees, yellow by 0 (or 90) degrees, and black by 45 degrees. If these angles are adhered to precisely, as well as the screen ruling being precisely identical for all four planes, then optimum results are achieved. Alternatively, the yellow plane can be screened with about a 15% finer screen ratio, producing slightly smoother rendition of flesh tones.

Precise screen angles can be achieved quite easily in photomechanical systems by simply rotating the photographic screen carrier. However, when the image is processed electronically, and the screened image is to be produced by a digital raster scan recording device, the problem becomes much more difficult. Rational numbers, which can be represented as the ratio of two integers, are relatively easy to accurately represent in a digital computer. Irrational numbers, which cannot be represented as the ratio of two integers, are much more difficult to accurately represent in a digital image processing device or digital computer. The tangent of a 15 or 75 degree angle is an irrational number. Therefore, screens of 15 and 75 degrees can be expected to be difficult to generate in a digital device. Also, irrational screen rulings where the number of pixels per screen cell is not a rational number can be expected to be difficult to accurately reproduce in a digital image processing device.

Prior art techniques fall into two classes. In the first class, the angles can be approximated, but not achieved precisely. These techniques are known as rational tangent angle techniques, because the screen angles are limited to arctangents of rational numbers. As a result of the inaccuracy of the screen angles and rulings, objectionable moire patterns result. A method exemplary of this technique is taught in U.S. Pat. No. 4,149,194 (Holladay). The screen pattern is represented by a strip of pixels. To generate the screen pattern, this strip is repeated across the width of the image. To angle the screen pattern, this strip is shifted by a certain number of pixels each scan line. An advantage of this technique is that it is very fast. Another advantage is the relatively modest memory requirement for the screen.

In the second class of screen generating techniques, precise angles and rulings can be achieved, but only at the cost of a large amount of computation for each pixel. This technique is described in U.S. Nos. 4,499,489 (Gall) and 4,350,996 (Rosenfeld). The device coordinate system is represented by XY space, and a halftone cell in the screen to be printed is represented by a vector in UV space, i.e. the coordinate system of the scaled and rotated screen. For each pixel, the position of the pixel in XY space is transformed into UV space. The screen pattern for that point can be determined by applying the spot function to the UV coordinates.

Although Gall and Rosenfeld describe certain speed optimizations, the disclosed technique requires many more operations per pixel than do rational angle techniques, and therefore runs considerably slower. Another technique for generating accurate screen angles is described in European Patent 0 427 380 A2 (Schiller). The Schiller patent describes a rational tangent angle method that can achieve fairly accurate screens at the cost of requiring a substantial amount of memory, typically on the order of hundreds of thousands of words.

The present invention provides a method for implementing a halftone screen pattern generation system for rotated screens including multiple angle and ruling combinations, and to produce a screened image formed with a rotated screen on a digital raster output device. In addition, the present invention provides a method of computing halftone screened images that can be implemented as a hardware circuit as well as a computer program.

SUMMARY OF THE INVENTION

As indicated above, a halftone screen is implemented using strips of an ideal angled screen pattern to form the horizontal scan lines of a desired screen. The discontinuity between adjacent strips is represented as a change in screen angle, or a jump in instantaneous screen angle error, which tends to introduce artifacts. In the horizontal direction, the magnitude and frequency of the jumps does not present a serious problem. However, in the vertical direction, the magnitude and frequency of the jumps between vertically adjacent strips can be a problem in certain portions of the generated screen.

In accordance with the present invention, screen angle correction artifacts are reduced by aligning the vertical boundaries between adjacent strips. By aligning the boundaries between successive adjacent strips in the vertical direction, the errors introducing irrational correction artifacts are not any greater than at the left edge of the screen. Since the strips at the left edge of the screen were originally selected for minimum error with respect to the strip above, the errors between successive horizontal strips in the vertical direction are tolerable and do not introduce noticeable artifacts. In such manner, excessive error between adjacent strips in the vertical direction is avoided.

In accordance with a first embodiment of the present invention, a screen pattern is generated by storing a plurality of strips from an ideal angled screen pattern, and then concatenating a sequence comprising a selected order of portions of the plurality of strips in a sequence. However, each of the strips is made twice as wide as was described in the patent application "SCREEN GENERATION FOR HALFTONE SCREENING OF IMAGES USING SCAN LINE SEGMENTS OF OVERSIZED SCREEN SCAN LINES", identified above. Then, regardless of the choice of starting point in the strip for each successive scan line, a sufficient portion of the double width strip is clocked out until the edge of the strip aligns with the edge of the strip above it.

In accordance with a second embodiment of the present invention, strips of a rational angled screen are concatenated to approximate an irrational angled screen. The screen values are derived from a strip of a rational screen having the closest rational angle to approximate the desired irrational angle. Errors which accumulate with each successive pixel are corrected by occasionally jumping to a new point in the strip. The vertical boundaries of successive horizontal strips aligned by causing the occasional jumps to occur at the same points for each successive scan line.

In accordance with a third embodiment of the present invention, a screen pattern is generated by assembling fixed width strips. Since the width of all strips is fixed, the vertical boundaries between adjacent strips are aligned. However, although the width of each strip is fixed, the contents of each strip is generally different. Fixed width strips are generated by storing an oversized strip from an ideal angled screen pattern, which oversized strip is longer than the maximum width of the desired fixed width strip, i.e. is oversized relative to the length of one fixed width strip of the desired halftone screen. For example, for a desired fixed width strip of 1024 pixels, a stored oversized strip of 2000 pixels long and 10 pixels high may be used. The chosen starting point in the oversized strip must be less than the stored oversized strip length (2000) minus the desired fixed width strip length (1024).

The scan lines of the desired screen pattern are created by selecting sections, i.e. segments of the oversized strip equal to the width of the desired scan line strip. In effect, the oversized strip is offset by a different amount for each desired scan line strip such that the selected scan line segment coincides with the fixed width scan line strip of the desired screen. Pixel values in the oversized strip that occur before the beginning of, or after the end of, the desired scan line width are not used in that scan line strip, and are discarded for that current scan line strip.

The method of the present invention can be practiced in a system including a scanner, an image processing device, and a raster scan output device. An original image is optoelectronically scanned and stored in memory. The image to be reproduced is divided into picture elements, or pixels, of a size suitable for halftone reproduction. On reproduction, each halftone dot is printed as a combination of smaller picture elements.

A halftone screened image is produced by (a) retrieving the pixel of the stored image pixel that corresponds to the present output pixel, (b) generating one pixel of the screen pattern, (c) comparing the image pixel and screen pixel, and (d) marking or not marking the output pixel on the basis of which was greater. The process is repeated for every output pixel. The sequence of output pixels is a raster scan, i.e. one horizontal scan line sequence of pixels followed by another horizontal scan line of pixels, which is the standard sequence for most image processing systems. The key problem solved by the present invention is to accurately generate the screen pixels in raster scan sequence.

BRIEF DESCRIPTION OF THE DRAWINGS

FIGS. 4b, 4c, and show a screen angle error function for various sections through the screen pattern shown in FIG. 4a.

FIG. 5a shows a screen pattern composed of a concatenated plurality of strips of screen data in accordance with the present invention.

FIG. 5b shows the strips used to generate the screen pattern of FIG. 5a.

FIG. 6b shows the strips used to generate the screen pattern of FIG. 6a.

FIG. 7b shows a screen angle error function through the section A-A' of FIG. 7a.

FIG. 7c shows the strips used to generate the screen pattern of FIG. 7a.

FIG. 8 is a flow chart for generating screening parameters in accordance with the present invention.

DETAILED DESCRIPTION

Figure 1:
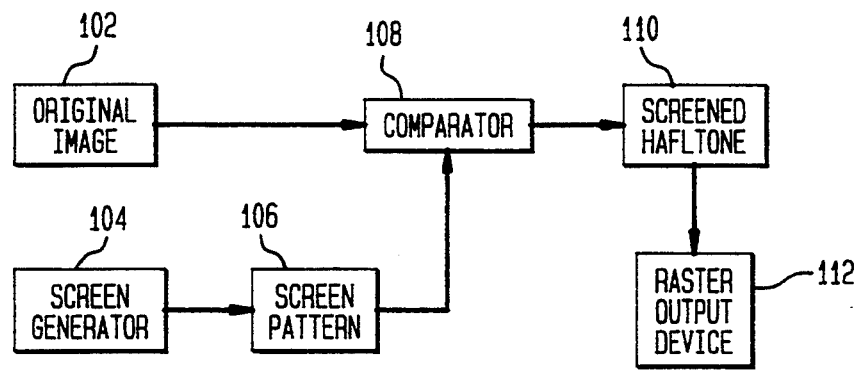
FIG. 1 shows a block diagram of a halftoning system utilizing the present invention.

The purpose of the present invention is to produce screened halftones from original images. Referring to FIG. 1, an original image source 102 is photomechanically scanned or otherwise prepared for reproduction in digital form, at which point it is presented to digital comparator 108. Although screening is described as a comparison operation between an input image and a screen pattern, it is to be understood that other operations between an input image and a screen pattern, such as multiplication or a general two dimensional lookup table, also qualify as a "screening" operation. It should be noted that in these other cases, the result of the screening operation is not necessarily restricted to two values.

A screen generator 104, preferably implemented as a program running on a digital computer, produces screen pattern 106, which is also presented to comparator 108. Both the original image 102 and the screen pattern 106 are composed of tiny sub-areal regions known as pixels, each of which represents a single gray shade.

Comparator 108 performs a pixel-by-pixel comparison of the original image 102 and the screen pattern 106. At pixel locations where the pixel from original image 102 is greater (i.e. a darker shade of gray) than the corresponding pixel from the screen pattern 106, the corresponding pixel in the screened halftone 110 is marked. At all other pixel locations, the screened halftone 110 is not marked, or alternatively, is marked a different way or with a different color.

The resulting screened halftone 110 is composed of dots of varying size and shape, each of which is composed of a number of pixels. Screened halftone 110 is then conveyed to raster output device 112, at which point it is recorded on photographic film or other image forming means.

Figure 2:
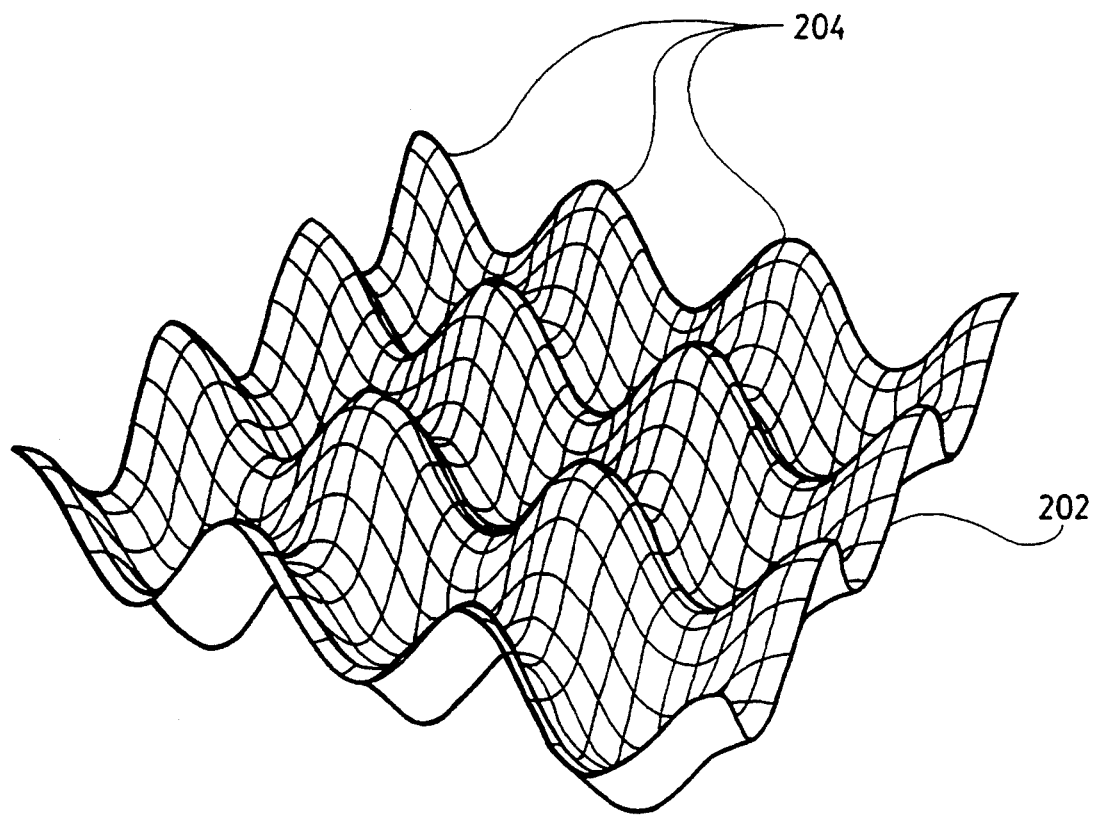
FIG. 2 shows the screen pattern as a three dimensional plot which may be used in conjunction with the present invention.

FIG. 2 shows a section of screen pattern 106 depicted as a surface in three dimensions. The grid squares represent individual screen pixels, while the height of each grid square represents the gray shade of the screen pattern at that pixel. Peak 204 represents a maximum gray shade; between peaks 204 are minimums representing minimum gray shades. A section through the surface in FIG. 2 will depict the spot function, which is roughly illustrated as a sine wave in the figure.

Figure 3:
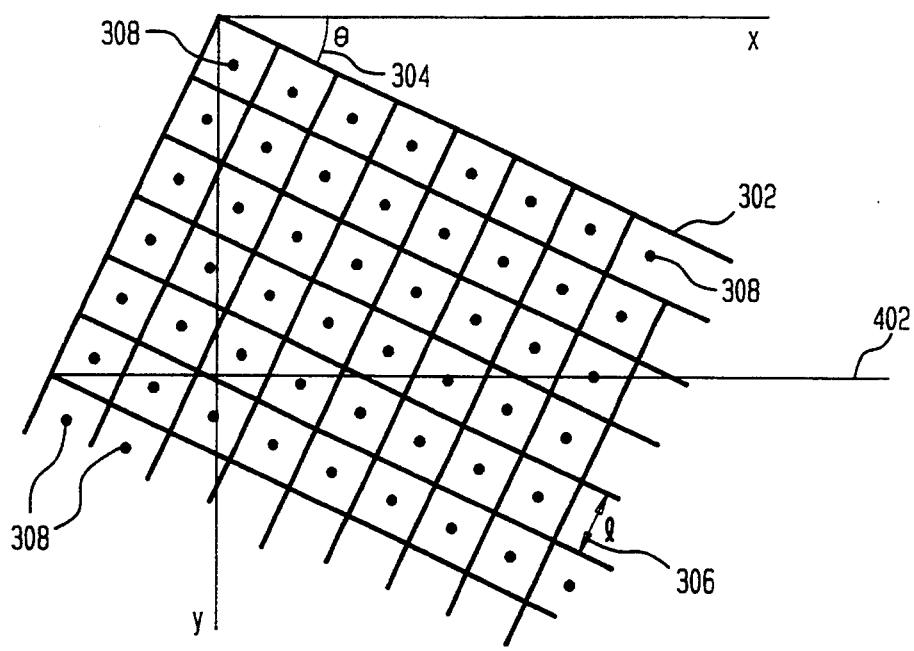
FIG. 3 shows the relation of the screen grid and the strip, to the output device coordinates, in accordance with the present invention.

FIG. 3 shows a representation of screen pattern 106. Dots 308 represent peaks of the screen pattern, corresponding to peaks 204. Such dots are positioned according to grid 302, which is rotated by angle 304 from the coordinate axes, and with spacing 306. The inverse of spacing 306 is the screen ruling of screen pattern 106. In general, spacing 306 and the tangent of angle 304 may be rational or irrational numbers. The present invention utilizes a strip, 402, which may be one or more pixels high, taken from an ideal angled screen.

Internal irrational correction artifacts

Figure 4A:
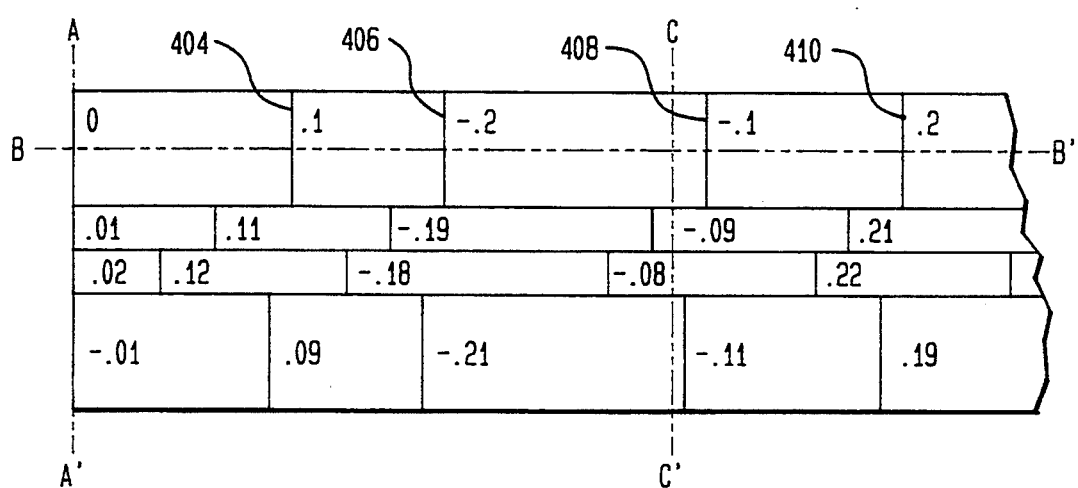
FIG. 4a shows a screen pattern composed of a concatenated plurality of strips of screen data as used in the above cited patent applications.

In FIG. 4a, a halftone screen is formed by using a plurality strips of an ideal angled screen concatenated to tile the plane. Each row of strips is the same height, but each strip may be a different width. In practice, the widths of the strips are drawn from a small set. Irrational correction artifacts, which are neither internal (interactions between the screen frequency and the frequency of pixels in the output device) nor external moire (interactions between the screen frequency and spatial frequencies present in the original image), may arise in some sections of the screen.

Within a strip or substrip, there are no irrational correction artifacts. All of the correction artifacts occur at the boundaries between substrips. In general, the artifact level is proportional to the error, measured in pixels, multiplied by the relative frequency of the boundaries between strips. Along a horizontal scan line, the vertical boundaries tend to create artifacts. Assuming that the average error from one strip to the next is about 0.5 pixels, and the average width of the strips is 1000 pixels, then the relative frequency of the vertical boundary is 0.001 counts / pixel. The resulting artifact level is thus 0.0005 of full scale, allowing 2000 shades of gray to be smoothly reproduced, which is an acceptable level of correction artifacts.

Another source of correction artifacts is the horizontal boundaries. Measured at the left edge of the screen pattern, the average error is around 0.005 pixels, with an average strip height of about 10 pixels. Thus, the artifact level resulting from these boundaries is also an acceptable 0.0005. Measured at the left edge of the screen pattern, the total artifact level from the vertical boundaries and the horizontal boundaries is 0.001, allowing 1000 shades of gray to be smoothly reproduced, which is also highly adequate performance.

While the average error in the horizontal X direction within one row of strips tends to be large, (because in practice the UV points can only be chosen from a small set of points within a single strip), the relative frequency of boundaries is low, so the result is a fairly low correction artifact level. In the Y direction at the left edge of the screen, the relative frequency of boundaries is high, but the average error is low, because UV points can be chosen from the entire strip, so the result is also a fairly low artifact level.

However, there is a third source of irrational correction artifacts. When not measured at the left edge of the screen pattern, the average errors in the Y direction are the same as in the X direction (i.e. on the order of 0.5 pixel), while the relative frequency of boundaries is also high (0.1 counts / pixel), resulting in a high artifact level, which may for example be 0.05, allowing only 20 shades of gray to be smoothly reproduced, which is not acceptable.

Figure 4B:
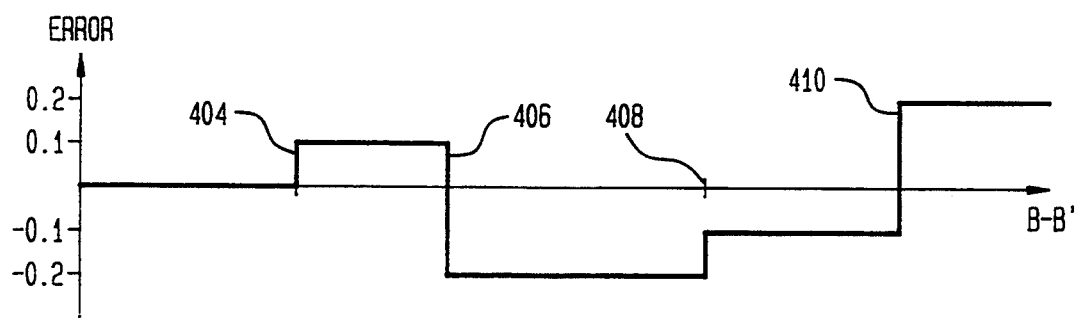
Figure 4C:
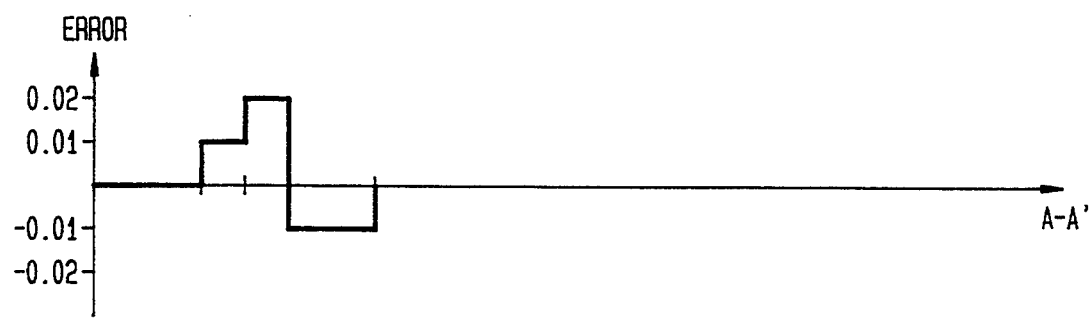
Figure 4D:
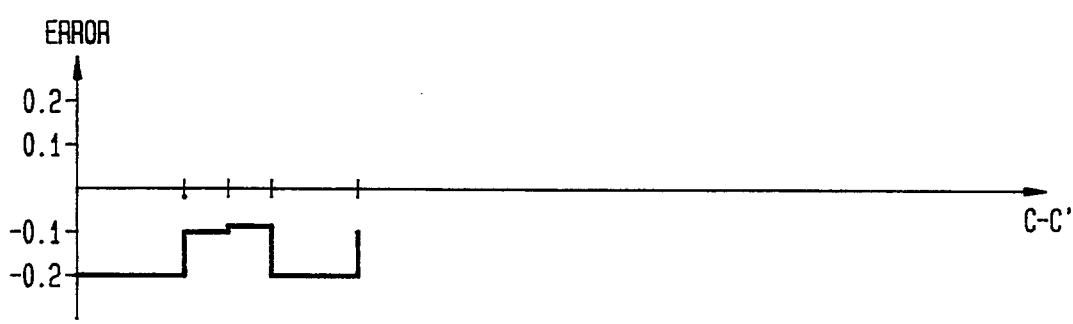

In FIG. 1, the numbers written inside the strips denote the U coordinate of the absolute error in each strip. Each strip consists of a two-dimensional array of pixels. The artifact level at each transition is proportional to the difference in U error levels between the two strips Along the line A-A', the artifact levels at the transitions are very small (0.01, 0.01, and −0.03), while the relative frequency of the transitions is fairly high. FIG. 4c shows the errors along line A-A'. Along the line B-B', the artifact levels are larger (0.1 at vertical edge 404, −0.3 at vertical edge 406, 0.1 at vertical edge 408, and 0.3 at vertical edge 410), while the relative frequency of transitions is lower. FIG. 4b shows the errors along line B-B'. The source of irrational correction artifacts is along the line C-C', in which the artifact levels are high (0.11, 0.01, −0.13), and the relative frequency is also high (the same relative frequency as along the line A-A'). FIG. 4d shows the errors along line C-C'. Thus, some areas of the screen are very clean and artifact free, but other areas show artifacts which appear as alternating vertical stripes.

In accordance with the present invention, screen angle correction artifacts are reduced by aligning the vertical boundaries between adjacent strips.

In a first embodiment, shown in FIG. 5a, the generated screen pattern is composed of strips 514, 516, 518 and 520, each of which may be one of several possible selected lengths. Successive scan lines have generally different starting points, X1, X2, and X3. The expressions drawn inside the blocks represent the X addresses of the first and last pixel of each block. The values of m, b, and c are calculated in exactly the same way as in the above cited patent application entitled, "SCREEN GENERATION FOR HALFTONE SCREENING OF IMAGES". To align the vertical boundaries, a double length strip comprising strip 502 of m pixels plus strip 504 of m additional pixels, which together form a double length strip of 2 m pixels of an ideal irrational angled screen, is used as shown in FIG. 5b. Strips 506 and 510 are illustrated as substrips of the first strip 502. Specifically, strip 502 is composed of m pixels, numbered from 0 to m-1. Strip 506 is composed of m - b pixels, numbered from b to m-1, a substrip of strip 502. Strip 510 is similarly composed of m - c pixels, numbered from c to m-1, also a substrip of strip 502. The strip 504 provides an extended portion which, regardless of the starting point in strip 502 (i.e., 0, b or c) sufficient pixels are available to be clocked out until the edge of the present strip aligns vertically with the edge of the strip above it.

Figure 6A:
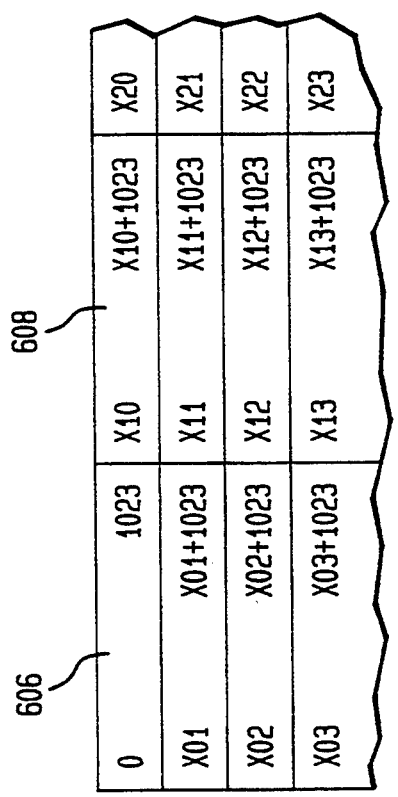
FIG. 6a shows a screen pattern composed of a concatenated plurality of strips of screen data in accordance with the present invention.
Figure 6B:
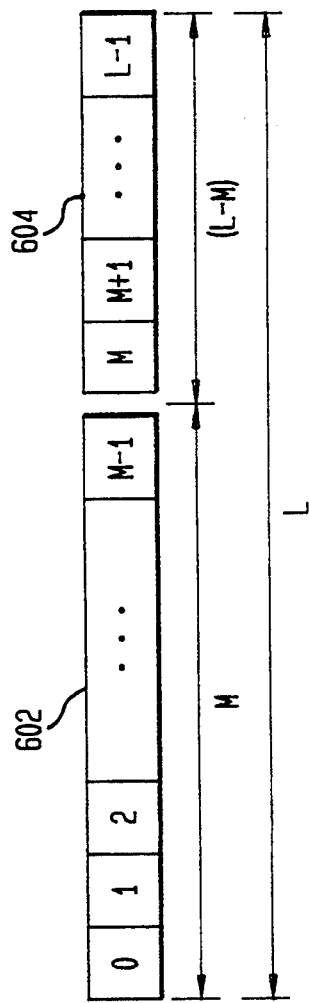

In another embodiment, shown in FIG. 6a, the generated screen pattern is composed of fixed length strips 606, 608, of an ideal irrational angled screen, each of which are a fixed length of m pixels, such as for example, 1024 pixels. Since each strip is the same length, the vertical boundaries are aligned. Each of the fixed length strips 606, 608 are a segment of an oversized strip, L pixels long, of an ideal irrational angled screen, which oversized strip comprises strip 602 of m pixels, plus an extended strip 604, to form an oversized strip as shown in FIG. 6b. The oversized strip 602, 604 is wider than the fixed length strip 606, as for example, the oversized strip may be 2000 pixels long and about 10 pixels tall.

For each selected fixed length strip of 1024 pixels, a pixel is chosen from the portion of the oversized strip 602, so as to be closest to the ideal irrational point. Then, 1024 points are read out successively, starting at the chosen pixel. The chosen beginning pixel (0, X01, X02, and X03 in FIG. 6a) in the oversized strip 602, 604 must be selected at a point less than the width of the oversized strip minus 1024, i.e., at less than L minus m, so that the right-most pixel read out from the oversized strip is still within the fixed length strip.

In other words, the oversized strip 602, 604, is offset by a different amount for each fixed length strip 606, such that the selected segment of the oversized strip 602, 604 coincides with the fixed length strip above, of the desired screen. Pixel values in the oversized strip 602, 604 that occur before the beginning of, or after the end of, the selected fixed length strip 606 are thus not used in the current fixed length strip 606, and are discarded for that current strip.

Figure 7A:
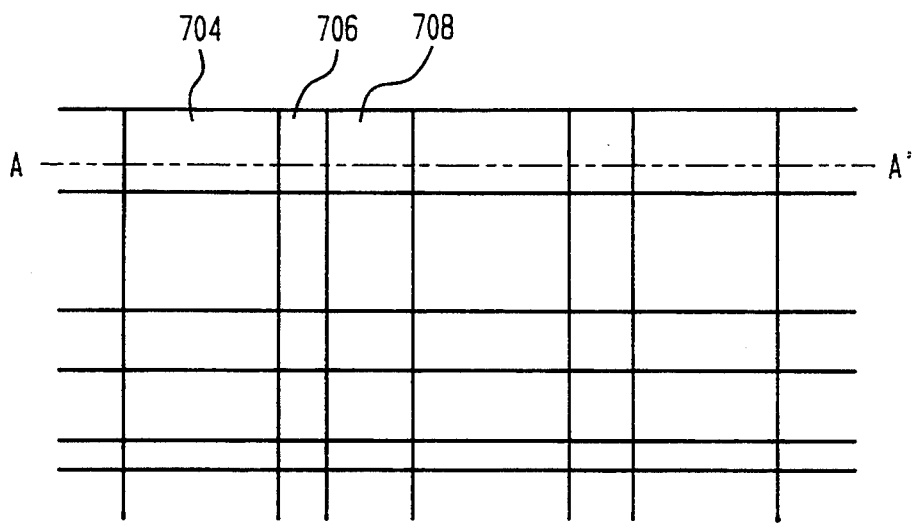
FIG. 7a shows a screen pattern composed of a concatenated plurality of strips of screen data in accordance with the present invention.

In yet another embodiment, shown in FIG. 7a, strips of a rational angled screen 704, 706, 708 are concatenated to approximate an irrational angled screen. The vertical boundaries of successive horizontal strips aligned by causing the occasional jumps to occur at the same points for each successive scan line.

Figure 7B:
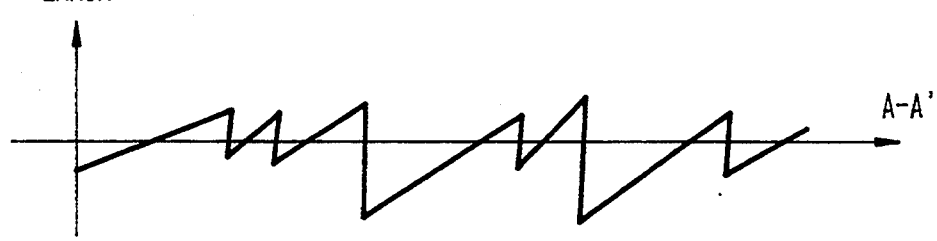
Figure 7C:
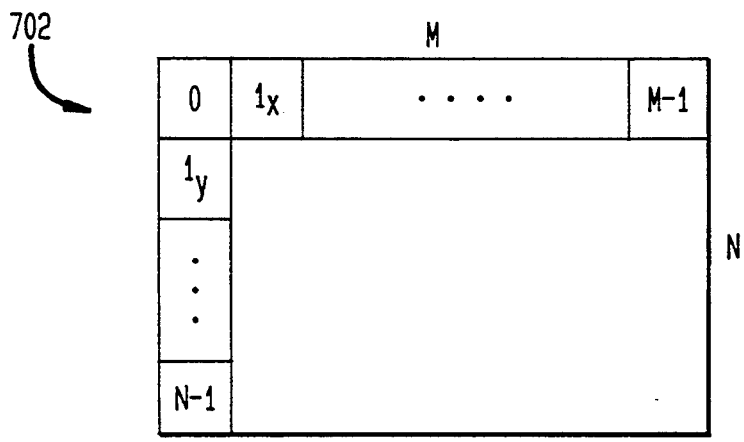

The strips 704, 706, and 708 in FIG. 7a are derived from a strip of a rational screen 702 having the closest rational angle to approximate the desired irrational angle, as shown in FIG. 7c. Rational strip 702 is m pixels wide (the X direction) by n pixels deep (the Y direction).

Since strip 704 is a rational angle approximation to an irrational angle screen, the error accumulates with each successive pixel. The error along section A-A' in FIG. 7a is illustrated in FIG. 7b. At the boundary between rational cells, the accumulated errors are compensated by jumping to a new point in the strip in a direction so as to tend to correct for the accumulated error, as illustrated in FIG. 7b. The error correction results in a jump, or a discontinuity in the instantaneous error between strips.

A strip 702 of a rational angled screen shown in generalized form is illustrated in FIG. 7c. The strip 702 is m pixels wide (length) by n pixels high (depth). The selection of m and n, which define the strip of a rational screen which will be used, is made by an initialization routine in response to a desired screen ruling and screen angle input.

To solve the problem of determining the height and width of the strip, and the exact jumps which will result in an exact irrational angle screen, an exhaustive search of all possible widths and heights is performed. For each combination of jumps in both the horizontal and vertical directions, the artifact level is calculated and the corresponding quality metric (a quality ranking or score) for each combination of width and height is calculated, The height and width combination with the best quality score is chosen. The quality ranking is composed of artifact level, memory usage, and optionally other factors (such as a hit ratio of a cache).

An initialization routine, responsive to screen angle and ruling, which determines the height and width of the rational strip, and the jumps in the X and Y directions is shown in the flow chart of FIG. 8. In response to a desired screen ruling R and screen angle $\theta$, a first height and width is selected at step 804. Then the jump vectors $A_x$, $B_x$, for the X direction, and $A_y$, $B_y$, for the Y direction, and the relative probability of occurrence, $c_a$ and $c_b$, is determined for the selected H and W at step 806. Also, the measure of screen quality, the quality metric, is computed at step 806. After all heights and widths of the rational cell 702, are determined at step 804, the height and width corresponding to the best quality metric is selected at step 810, and the corresponding $A_x$, $B_x$, $A_y$, $B_y$, $c_a$ and $c_b$ is output to the screen generator at step 812.

The quality metric contains several components, the two most important of which are the artifact level and the memory usage. My current formulation of the quality metric is:

$q = qx + qy + qm + qw$, where $qx = f$ (x artifact level)
$qy = f$ (y artifact level)
$qm = 3 \cdot 10^{-8}$ width·height
$qw = 0$, if width<7000;
 $2.50 \cdot 10^{-4}$, otherwise
$f(z) = z/4$, if $z<0.001$; $z - 7.5 \cdot 10^{-4}$, otherwise The lower the value of q, the better. The qw component is designed to reflect the hit ratio of the cache while retrieving screen pattern values during the screening of a scan line. To generate one scan line of the screen pattern, values are repeatedly drawn from one line of the cell. If this line fits within the internal cache of the processor generating the screen pattern, then the cache hit ratio will be dramatically improved, as will the overall screen generation speed. On the Intel 80486, the internal cache is 8 k bytes, so leaving 1 k for other uses, the performance is optimized if the width is less then 7000. Thus, if the width is over 7000 pixels, the quality metric is penalized by $2.50 \cdot 10^{-4}$.

When proceeding with the search, a variable 'best so far' is maintained. Since all of the components of the quality metric are positive, no width/height combination larger than mmax (where mmax='best so far'/$3 \cdot 10^{-8}$) could possibly be the combination with the best possible quality metric. Thus, the search is limited so that no value for width is tested that is greater than mmax/width. The search can be limited somewhat further by taking the qw term into account, as well.

In operation, a desired screen ruling R and screen angle theta $\theta$ is set as an input to the system. In short, the search algorithm, in pseudocode:

```
input screen angle and ratio
qbest = 10
width = 1
while width · 3 · 10⁻⁸ < qbest
    calculate qx, qw for width
    height = 1
    while width · height · 3 · 10⁻⁸ + qx + qw < qbest
        calculate qy for width, height combination
        q = qx + qy + width · height · 3 · 10⁻⁸ + qw
        if q < qbest
            qbest = q
            mmax = qbest/3 · 10⁻⁸
            save width, height as "best so far"
        end if
        height = height + 1
    end while
    width = width + 1
end while
retrieve "best so far" width, height
prepare cell(using grayscale error diffusion, for example)
screen any number of halftones
```

The technique of exhaustive search is only practical if there is a fast way of computing the jump vectors, their relative probabilities, and thus, the resulting artifact level. The following description is a way of rapidly performing the necessary calculations. The technique is similar to finding the greatest common denominator of two numbers, except that the process is performed on three 2-d vectors, and the result is two vectors, which are the jump vectors. The relative probabilities can be found by solving linear equations.

The transformation of XY into UV coordinates

The XY coordinates represent coordinates of the actual output device. X is the direction of the scan line, Y is perpendicular. XY coordinates also address memory locations in the cell, because the cell is stored pre-rotated and is used to generate the screen pattern without further rotation.

XY coordinates of the actual device can be transformed into UV coordinates with the following formula:

$$U' = X \cdot U\text{Fast} + Y \cdot U\text{Slow}$$
$$V' = X \cdot V\text{Fast} + Y \cdot V\text{Slow}$$
$$U = U' - \text{round}(U')$$
$$V = V' - \text{round}(V')$$

Typically,
$U\text{Fast} = \cos\theta \cdot R/x\text{-resolution}$
$V\text{Fast} = \sin\theta \cdot R/x\text{-resolution}$
$U\text{Slow} = -\sin\theta \cdot R/y\text{-resolution}$
$V\text{Slow} = \cos\theta \cdot R/y\text{-resolution}$,
where
$\theta$ is the screen angle and
R is the screen ruling However, once a cell width and height are established, the UV coordinates of a given XY point within the cell are determined using somewhat different values for UFast, VFast, USlow, and VSlow.

$U\text{Fast}' = \text{round}(U\text{Fast} \cdot \text{width})/\text{width}$
$V\text{Fast}' = \text{round}(V\text{Fast} \cdot \text{width})/\text{width}$
$U\text{Slow}' = (\text{round}(s \cdot U\text{Fast}' + \text{height} \cdot U\text{Slow}) -$ $s \cdot U\text{Fast}')/\text{height}$ $V\text{Slow}' = (\text{round}(s \cdot V\text{Fast}' + \text{height} \cdot V\text{Slow}) -$ -continued $$s \cdot VFast')/height$$

Using this second transform, both XY points (width, 0) and (s,height) transform to (0,0) in UV space. The value "s" in these cases refers to the shift, as defined below.. Note that the calculation of the Fast' coefficients depends only on the width, while the Slow' coefficients depend on both width and height.

The discrepancy between the Fast, Slow coefficients and their Fast' Slow', counterparts is the error that must be corrected in order to produce true irrational angles. The correction process leads to its own artifacts. It is a key feature of the present invention to quantify and minimize these resulting artifacts.

For each successive pixel in the X direction (including both i to i+1 and width-1 to 0 increments), the error accumulates (UFast-UFast', VFast-VFast') in UV coordinates For each successive scan line (i.e. pixel in the Y direction), the error accumulates (USlow-USlow', VSlow-VSlow') The error is corrected by occasional jumps.

Bringing XY points inside the cell

In order to access a point in the cell, the XY coordinates must reference inside the cell, i.e. $0 \leq X <$ width and $0 \leq Y <$ height. However, the result of a vector operation (such as adding a jump vector to the screen cell pointer) may result in XY coordinates that are outside the cell. Because the cell is circular, an equivalent point inside the cell can be found.

Any $X$ coordinate which is outside the cell can be brought insidethe cell by taking
$X$ mod width
The "mod" operation refers to modulo. It is to be calculated as follows (result of $a$ mod $b$ is stored in $c$):

```
c = a
while c < 0
    c = c + b
end while
while c ≥ b
    c = c − b
end while
```

Any $XY$ vector which is outside the cell can be brought into the cell with the following operation (the vector is assumed to be in $A$):

```
while A_y < 0
    A_x = A_x + s
    A_y = A_y + height
end while
while A_y ≥ height
    A_x = A_x − s
    A_y = A_y = height
end while
A_x = A_x mod width
```

Determination of the jump vectors

The addresses of the jumps, as well as their corresponding UV vectors, are determined using the "3-vector GCD" process. The "3-vector GCD" is an adaption of the well known algorithm (known as Euclid's algorithm) for computing the greatest common denominator of two integers. Euclid's algorithm is presented below, for contrast. The arguments are originally stored in the variables a and b, and the result is stored in the variable a.

```
while a ≠ b
    if a > b, then a = a − b
    else if b > a, then b = b − a
end
```

The novel corresponding algorithm for vectors is presented below. For the X direction (along a scan line), A is initialized with the XY point (m,0) transformed to UV space, B is initialized with the XY (0,m) transformed to UV, and C is initialized with XY (1,0) transformed to UV.

```
while A ≠ B and B ≠ C and C ≠ A and A ≠ −B and
B ≠ −C and C ≠ −A and
    if |A − B| < |A| then A = A − B
    else if |A − B| < |B| then B = B − A
    else if |A + B| < |A| then A = A + B
    else if |A + B| < |B| then B = B + A
    else if |B − C| < |B| then B = B − C
    else if |B − C| < |C| then C = C − B
    else if |B + C| < |B| then B = B + C
    else if |B + C| < |C| then C = C + B
    else if |C − A| < |C| then C = C − A
    else if |C − A| < |A| then A = A − C
    else if |C + A| < |C| then C = C + A
    else if |C + A| < |A| then A = A + C
end
```

In other words, if the difference of a pair of vectors is of lesser magnitude than one of the pair, then that one is replaced by the difference, iteratively, until two of the three vectors are the same. When the iteration is finished, the three vector variables contain two different vectors, which are the 'jump' vectors.

The | | symbols refer to vector magnitude in UV space. It is also worthwhile to store, and perform vector operations upon, the XY coordinates that will identify the jumps in terms of address. Specifically, each bold-faced vector variable is used to store four coordinate values: U, V, X, and Y. When an arithmetic operation is specified, for example subtraction, it is applied to each of the four coordinates separately. The coordinates can be referenced separately. For example, $A_x$ is the X coordinate of the vector variable A.

For the X direction, the X coordinate variables corresponding to the vector variables A, B, and C are initialized to 0, 0, and 1 respectively. There is no Y coordinate for jumps in the X direction, so it defaults to zero.

In the Y direction, A and B are initialized to the results of the X calculation, and the variable C is initialized to the XY point (0,1) transformed to UV space. The XY coordinates of A and B are left as they were from the X direction calculation. The XY coordinates of C are initialized to (0,1).

Once the jumps are determined, the closest point in the cell to any given UV vector can be found solving a set of linear equations. Specifically, assume that the vectors A and B represent the jumps in UV space, and that the point closest to the vector X is desired. Then, the following set of linear equations is solved for $c_a$ and $c_b$:

$$c_a \cdot A_u + c_b \cdot B_u = X_u$$
$$c_a \cdot A_v + c_b \cdot B_v = X_v$$

The solution is:
$$c_a = (B_u \cdot X_v − X_u \cdot B_v)/(A_v \cdot B_u − B_v \cdot A_u)$$
$$c_b = (X_u \cdot A_v − A_u \cdot X_v)/(A_v \cdot B_u − B_v \cdot A_u)$$

Then, the point (p,0) in the cell closest to X is determined as follows:

$$p = (\text{round }(c_a) \cdot A_x + \text{round }(c_b) \cdot B_x)) \text{ mod width}$$

In this way, the value of "s" is determined. Using the X jumps only, the point (s,0) closest to (height·USlow, height·VSlow) is found.

If A and B contain the jumps, and X is the error vector that accumulates for every pixel, then solving the above set of linear equations for $c_a$ and $c_b$ results in the relative probabilities of the A jump vector and the B jump vector, respectively. If a relative probability comes out negative, then both the relative probability and the corresponding vector should be negated. During generation of the scan line, the jumps should be applied with the given relative probabilities.

A similar algorithm to the above is used to determine the XY coordinates for the first pixel in each scan line.

Given the width, in order to calculate the x artifact level, then, the following steps are carried out:

Calculate $U\text{Fast}'$, $V\text{Fast}'$
$A = (1,0)$ in $UV$ coordinates, $(0,0)$ in $XY$
$B = (0,1)$ in $UV$ coordinates, $(0,0)$ in $XY$
$C = (U\text{Fast}', V\text{Fast}')$ in $UV$ coordinates, $(1,0)$ in $XY$
calculate "3-vector GCD" as described above, store results in $A$ and $B$
$X = (U\text{Fast} - U\text{Fast}', V\text{Fast} - V\text{Fast}')$
solve above linear equations for $c_a$, $c_b$
X artifact level $= |c_a \cdot A| + |c_b \cdot B|$
save $A$ and $B$ values for Y artifact calculation
Then, given the height, the value of $s$ is found:
$X = (U\text{Slow} \cdot \text{width}, V\text{Slow} \cdot \text{width})$
solve above linear equations for $c_a$, $c_b$
$s = (\text{round}(c_a) \cdot A_x + \text{round}(c_b) \cdot B_x)$ mod width
The Y artifact can then be found using the following procedure:
Calculate $U\text{Slow}'$, $V\text{Slow}'$
retrieve $A$ and $B$ values from $X$ artifact calculation
$C = (U\text{Slow}', V\text{Slow}')$ in $UV$ coordinates, $(0,1)$ in $XY$
calculate "3-vector GCD" as above, results in $AY$ and $BY$
$X = (U\text{Slow} - U\text{Slow}', V\text{Slow} - V\text{Slow}')$
solve above linear equations for $c_a$, $c_b$
Y artifact level $= |c_a \cdot AY| + |c_b \cdot BY|$ Alternative method for X jumps In some cases, particularly very close (within 0.05 degree) to a rational angle, the X jumps will be very large (i.e. more than 1 pixel in XY space, or 1/R in UV space). It may be possible to reduce the X jumps by allowing the X jumps to move in both the X and Y directions. Normally, only one scan line of the cell is used to generate one line of the screen pattern. With this alternate method, the entire cell can be used to generate each line of the screen pattern.

The jumps are the same as for the Y direction, but the relative frequency is different. The relative frequencies can be determined by setting X equal to (USlow-USlow', UFast-UFast'), and calculating $c_a$ and $c_b$ exactly as for the Y jumps. Again, if a relative probability comes out negative, both the probability and the corresponding jump vector are negated, resulting in positive probabilities.

Determining the screen values stored in the cell

To determine the screen values to be stored in the cell, each XY location in the cell is transformed into its corresponding UV coordinate (using the Fast' and Slow' coefficients, rather than the Fast and Slow). Then, the spot function is applied to the resulting UV coordinates. Finally, after all spot function values within the cell are determined, grayscale error diffusion (as in the above cited copending patent application entitled "METHOD AND APPARATUS FOR HALFTONING OF IMAGES USING GRAY-SCALE ERROR DIFFUSION") is performed, exactly as in the rational supercell case.

Generation of a scan line

Once the jump vectors $A_x$, $B_x$, for the X direction, and the jump vectors $A_y$, $B_y$, for the Y direction, and the relative probability of occurrence, $c_a$ and $c_b$, are determined, the scan lines of the desired screen can be generated.

Figure 9:
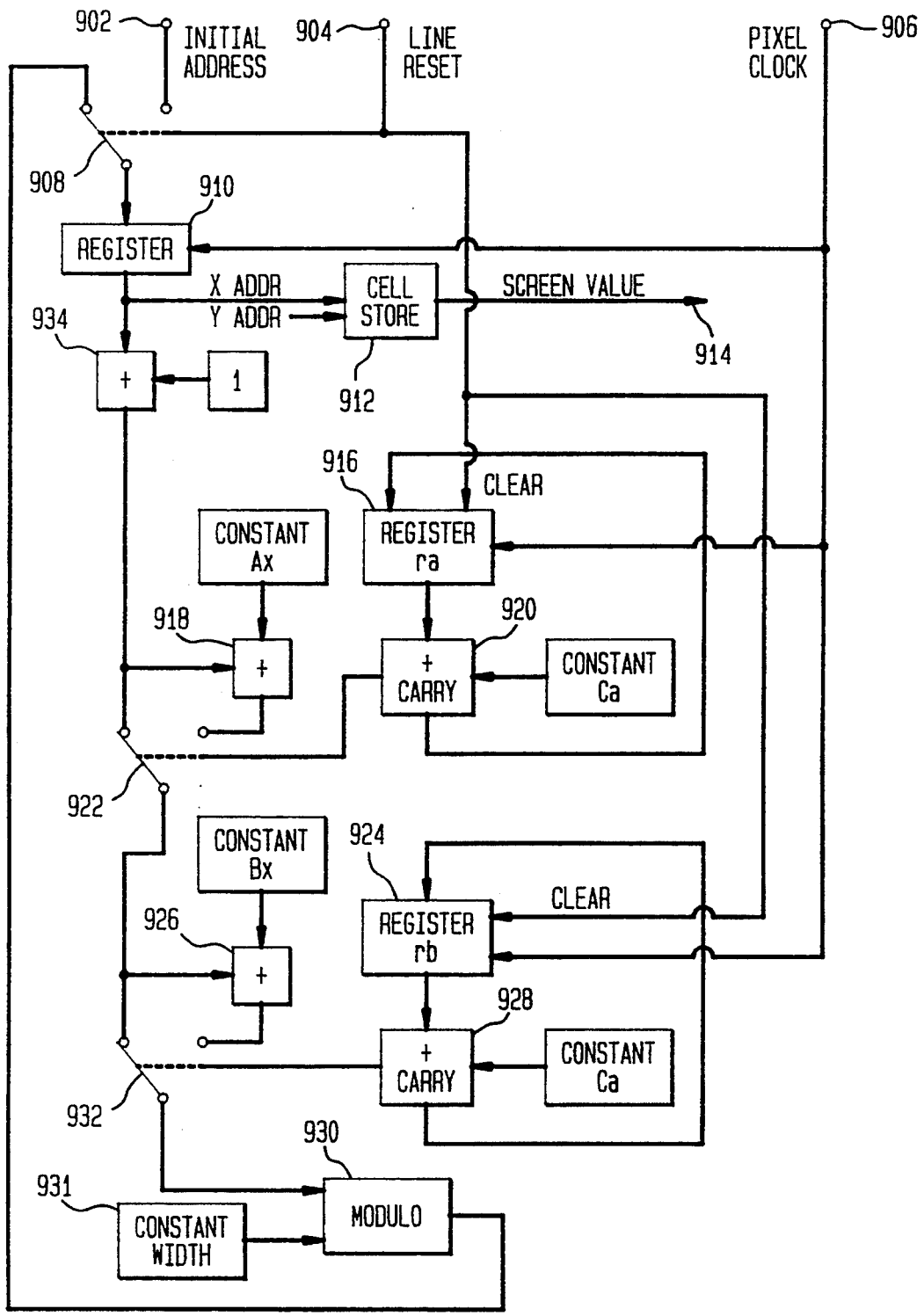
FIG. 9 is a block diagram for generating each scan line of a screen pattern in accordance with the present invention.

To generate a scan line, the first step is to determine the first screen cell pixel in the scan line. Then, the remainder of the scan line is generated using the following algorithm:

$x, y = XY$ coordinates for first pixel in scan line
$ra = 0$
$rb = 0$
repeat
    generate value cell$(x,y)$ in screen pattern
    $x = (x + 1)$ mod width
    $ra = ra + c_a$
    if $ra \geq 1$ then
        $ra = ra - 1$
        $x = (x + A_x)$ mod width
    end if
    $rb = rb + c_b$
    if $rb \geq 1$ then
        $rb = rb - 1$
        $x = (x + B_x)$ mod width
    end if
until entire scan line has been generated The basic technique is to increment the screen cell address pointer X, using circular arithmetic, while also applying the jumps $A_x$ and $B_x$ with the relative probabilities $c_a$ and $c_b$. Because the cell is addressed circularly, the jumps can be applied at any point during the scan line. A block diagram for generating the horizontal scan lines of the desired screen is shown in FIG. 9. First, prior to the generation of the first scan line, the jumps $A_x$ and $B_x$ and their relative probabilities $c_a$ and $c_b$ as determined as above, are stored in corresponding registers indicated in FIG. 9. Also, the selected strip of m by n pixels of an ideal rational angled screen is stored in cell store 912.

Switch 908 is responsive to the line reset signal 904 to gate an initial address on terminal 902 to register 910, switch 922 is responsive to the carry output of adder 920 to either add or not add the jump value $A_x$ to a current address value, and switch 932 is responsive to the carry output of adder 928 to either add or not add the jump value $B_x$ to a current address value. A modulo arithmetic function 930 is provided which performs the modulo arithmetic necessary for circular addressing of the strip in cell store 912. By way of a decimal example, if the constant width register 931 (the strip width m pixels) holds a value of 10, and the address value on the other input to modulo function 930 is 23, then the output of modulo function 930 is 3, because 23 modulo 10 is equal to 3.

In operation, an initial address for starting a horizontal scan line is input at terminal 902, the pixel clock is applied at terminal 906, and a line reset signal is applied at terminal 904 which resets registers ra, 916 and rb, 924. The current X address held in register 910 and applied to cell store 910 provides a first pixel screen value output at terminal 914. Adder 934 adds a constant value of 1 to the contents of the address register 910.

With each successive pixel clock on terminal 906, registers ra 916 and rb 924 are incremented. The output of register ra 916 is added to constant $c_a$ in adder 920, and the result loaded back into register ra, while the carry output of adder 920 controls switch 922. When there is a carry output from adder 920, the constant address jump $A_x$ is added to the output of adder 934, by adder 918. Otherwise, switch 922 is positioned so that the incremented address from adder 916 is unchanged.

Similarly, the output of register rb 924 is added to constant $c_b$ in adder 928, and the result loaded back into register rb, while the carry output of adder 928 controls switch 932. When there is a carry output from adder 928, the constant address jump $B_x$ is added to the output of switch 922, by adder 926. Otherwise, switch 932 is positioned so that the address from switch 922 passes through switch 932 unchanged.

Thus, address jumps $A_x$ and $B_x$ are applied as additions to the X address register 908 with the relative probabilities of $c_a$ and $c_b$, respectively. As the contents of the register 910 steadily increments through, and occasionally jumps to a new address within the cell store 912, the successive screen values of the desired halftone screen are generated at output terminal 914. Line reset signal clears registers ra 916 and rb 924 prior to each scan line, causing the jumps to always occur in the same places for each scan line, thus minimizing irrational correction artifacts.

During the generation of the horizontal scan line, a constant vertical address representing the current scan line is input into the Y address input to cell store 912. The Y address input changes for each for each successive scan line. In a manner similar to generation of X address, Y address are generated by incrementing and applying address jumps with relative probabilities. Circular arithmetic is also used in the vertical direction to generate the repeating rational screen pattern stored in cell store 912.

For the Y direction, the same technique can be applied to find the first screen pixel in each scan line. The algorithm is as follows:

```
x = 0
y = 0
rya = 0
rby = 0
repeat
    generate scan line using x,y as starting pixel
    y = (y + 1) mod width
    rya = rya + c_a
    if rya ≧ 1 then
        rya = rya - 1
        x = x + AY_x
        y = y + AY_y
        bring x,y inside cell
    end if
    ryb = rby + c_b
    if ryb ≧ 1 then
        ryb = ryb - 1
        x = x + BY_x
        y = y + BY_y
        bring x,y inside cell
    end if
until all scan lines have been generated.
```

What is claimed is:

1. A method for generating a halftone screened image from an original image, said method comprising:

generating a plurality of strips, each of said plurality of strips representing a portion of a rational angled screen pattern;

concatenating ones of said plurality of strips in a sequence forming a generated screen pattern to approximate an irrational angled generated screen pattern;

wherein the length of each of said plurality of strips is selected so that vertically adjacent strips have substantially equal lengths, whereby the vertical boundaries of said vertically adjacent strips are aligned; and screening said original image with said generated screen pattern to form said halftone screened image.

2. A method in accordance with claim 1, wherein said step of generating said plurality of strips comprises:

storing a portion of a rational angled screen pattern;

determining, responsive to a desired screen angle and screen ruling, first and second jumps and the relative probabilities of said determined first and second jumps;

reading successive values of said rational angled screen pattern from said stored portion of said rational angled screen pattern;

jumping over a number of successive values in said stored rational angled screen pattern by an amount equal to said first jump, said first jump occurring at a relative probability equal to said determined relative probability of said first jump; and jumping over a number of successive values in said stored rational angled screen pattern by an amount equal to said second jump, said second jump occurring at a relative probability equal to said determined relative probability of said second jump.

3. A method in accordance with claim 2, wherein said step of generating said plurality of strips further comprises:

placing said and second jumps in each successive scan line of said generated screen pattern at substantially the same points as the previous scan line of said generated screen pattern, so that vertically adjacent strips have substantially equal lengths, whereby the vertical boundaries of said vertically adjacent strips are aligned.

4. A method in accordance with claim 2, wherein said step of storing a portion of a rational angled screen pattern comprises:

determining, responsive to said desired screen angle and screen ruling, the height and width of said portion of said rational angled screen pattern.

5. A method in accordance with claim 1, where said step of screening said original image with said generated screen pattern to form said halftone screened image comprises:

comparing said generated screen pattern with said original image; and generating a marking signal for a marking device based on said comparison between said generated screen pattern and said original image.

6. A method for generating a halftone screened image from an original image, said method comprising:

storing a plurality of strips, each of said plurality of strips representing a portion of an ideal irrational angled screen pattern;

concatenating ones of said plurality of strips in a sequence to form a first scan line of a generated screen pattern;

concatenating ones of said plurality of strips in a sequence to successive scan lines of said generated screen pattern;

wherein the length of each of said plurality of strips in said successive scan lines is selected so that vertically adjacent strips in said first and successive scan lines have substantially equal lengths, whereby the vertical boundaries of said vertically adjacent strips in said first and successive scan lines are aligned; and screening said original image with said generated screen pattern to form said halftone screened image.

7. A method in accordance with claim 6, wherein the first strip of said plurality of strips comprises a portion of an ideal irrational angled screen pattern, and the remainder of said plurality of strips comprises one or more substrips of said first strip.

8. A method in accordance with claim 6, where said respective steps of concatenating ones of said plurality of strips in a sequence forming said first and successive scan lines of said generated screen pattern further comprises:

computing an error function based on the difference between the generated screen pattern and an ideal desired screen pattern; and selecting a next selected one of said plurality of strips in said sequence so that said error function of one of said plurality of strips combined with the error function of said selected next of said plurality of strips produces the least combined error.

9. A method in accordance with claim 6, where said step of screening said original image with said generated screen pattern to form said halftone screened image comprises:

comparing said generated screen pattern with said original image; and generating a marking signal for a marking device based on said comparison between said generated screen pattern and said original image.

10. A method for generating a halftone screened image from an original image, said method comprising:

generating a plurality of strips, each of said plurality of strips having a given length, each of said plurality of strips representing a portion of a rational angled screen pattern;

concatenating ones of said plurality of strips having said given length in a sequence forming a generated screen pattern to approximate an irrational angled generated screen pattern, whereby the vertical boundaries of said vertically adjacent strips are aligned; and screening said original image with said generated screen pattern to form said halftone screened image.

11. A method in accordance with claim 10, wherein said step of generating said plurality of strips comprises:

storing an oversized strip having a width equal to at least twice said given length, said oversized strip representing a portion of an ideal irrational angled screen pattern;

selecting scan line segments of said oversized strip, the length of each of said selected scan line segments being substantially equal to said given length.

12. A method in accordance with claim 10, where said step of selecting scan line segments of said oversized strip further comprises:

computing an error function based on the difference between the generated screen pattern and an ideal desired screen pattern; and selecting a scan line segment of said oversized strip from a plurality of scan line segments so that said error function of said selected scan line segment combined with the error function of said previous selected scan line segment produces the least combined error.

13. A method in accordance with claim 10, where said step of screening said original image with said generated screen pattern to form said halftone screened image comprises:

comparing said generated screen pattern with said original image; and generating a marking signal for a marking device based on said comparison between said generated screen pattern and said original image.

14. An apparatus for generating a halftone screened image from an original image, said apparatus comprising:

means for generating a plurality of strips, each of said plurality of strips representing a portion of a rational angled screen pattern;

means for concatenating ones of said plurality of strips in a sequence forming a generated screen pattern to approximate an irrational angled generated screen pattern;

wherein the length of each of said plurality of strips is selected so that vertically adjacent strips have substantially equal lengths, whereby the vertical boundaries of said vertically adjacent strips are aligned; and means for screening said original image with said generated screen pattern to form said halftone screened image.

15. An apparatus in accordance with claim 14, wherein said means for generating said plurality of strips comprises:

means for storing a portion of a rational angled screen pattern;

means for determining, responsive to a desired screen angle and screen ruling, first and second jumps and the relative probabilities of said determined first and second jumps;

means for reading successive values of said rational angled screen pattern from said stored portion of said rational angled screen pattern;

means for jumping over a number of successive values in said stored rational angled screen pattern by an amount equal to said first jump, said first jump occurring at a relative probability equal to said determined relative probability of said first jump; and means for jumping over a number of successive values in said stored rational angled screen pattern by an amount equal to said second jump, said second jump occurring at a relative probability equal to said determined relative probability of said second jump.

16. An apparatus in accordance with claim 15, wherein said means for generating said plurality of strips further comprises:

means for placing said and second jumps in each successive scan line of said generated screen pattern at substantially the same points as the previous scan line of said generated screen pattern, so that vertically adjacent strips have substantially equal lengths, whereby the vertical boundaries of said vertically adjacent strips are aligned.

17. An apparatus in accordance with claim 15, wherein said means for storing a portion of a rational angled screen pattern comprises:

means for determining, responsive to said desired screen angle and screen ruling, the height and width of said portion of said rational angled screen pattern.

18. An apparatus in accordance with claim 14, where said means for screening said original image with said generated screen pattern to form said halftone screened image comprises:
- means for comparing said generated screen pattern with said original image; and
- means for generating a marking signal for a marking device based on said comparison between said generated screen pattern and said original image.

19. An apparatus for generating a halftone screened image from an original image, said apparatus comprising:
- means for storing a plurality of strips, each of said plurality of strips representing a portion of an ideal irrational angled screen pattern;
- means for concatenating ones of said plurality of strips in a sequence to form a first scan line of a generated screen pattern;
- means for concatenating ones of said plurality of strips in a sequence to successive scan lines of said generated screen pattern;
- wherein the length of each of said plurality of strips in said successive scan lines is selected so that vertically adjacent strips in said first and successive scan lines have substantially equal lengths, whereby the vertical boundaries of said vertically adjacent strips in said first and successive scan lines are aligned; and
- means for screening said original image with said generated screen pattern to form said halftone screened image.

20. An apparatus in accordance with claim 19, wherein the first strip of said plurality of strips comprises a portion of an ideal irrational angled screen pattern, and the remainder of said plurality of strips comprises one or more substrips of said first strip.

21. An apparatus in accordance with claim 19, where said respective means for concatenating ones of said plurality of strips in a sequence forming said first and successive scan lines of said generated screen pattern further comprises:
- means for computing an error function based on the difference between the generated screen pattern and an ideal desired screen pattern; and
- means for selecting a next selected one of said plurality of strips in said sequence so that said error function of one of said plurality of strips combined with the error function of said selected next of said plurality of strips produces the least combined error.

22. An apparatus in accordance with claim 19, where said means for screening said original image with said generated screen pattern to form said halftone screened image comprises:
- means for comparing said generated screen pattern with said original image; and
- means for generating a marking signal for a marking device based on said comparison between said generated screen pattern and said original image.

23. An apparatus for generating a halftone screened image from an original image, said apparatus comprising:
- means for generating a plurality of strips, each of said plurality of strips having a given length, each of said plurality of strips representing a portion of a rational angled screen pattern;
- means for concatenating ones of said plurality of strips having said given length in a sequence forming a generated screen pattern to approximate an irrational angled generated screen pattern, whereby the vertical boundaries of said vertically adjacent strips are aligned; and
- means for screening said original image with said generated screen pattern to form said halftone screened image.

24. An apparatus in accordance with claim 23, wherein said means for generating said plurality of strips comprises:
- means for storing an oversized strip having a width equal to at least twice said given length, said oversized strip representing a portion of an ideal irrational angled screen pattern;
- means for selecting scan line segments of said oversized strip, the length of each of said selected scan line segments being substantially equal to said given length.

25. An apparatus in accordance with claim 23, where said means for selecting scan line segments of said oversized strip further comprises:
- means for computing an error function based on the difference between the generated screen pattern and an ideal desired screen pattern; and
- means for selecting a scan line segment of said oversized strip from a plurality of scan line segments so that said error function of said selected scan line segment combined with the error function of said previous selected scan line segment produces the least combined error.

26. An apparatus in accordance with claim 23, where said means for screening said original image with said generated screen pattern to form said halftone screened image comprises:
- means for comparing said generated screen pattern with said original image; and
- means for generating a marking signal for a marking device based on said comparison between said generated screen pattern and said original image.

* * * * *